US 6,622,593 B2

(12) United States Patent
Kobayashi et al.

(10) Patent No.: US 6,622,593 B2
(45) Date of Patent: Sep. 23, 2003

(54) LIGHTWEIGHT WAVE GEAR DEVICE

(75) Inventors: Masaru Kobayashi, Nagano-ken (JP); Yoshihiro Tanioka, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/147,079

(22) Filed: May 17, 2002

(65) Prior Publication Data

US 2002/0184968 A1 Dec. 12, 2002

(30) Foreign Application Priority Data

May 22, 2001 (JP) ....................................... 2001-151831

(51) Int. Cl.[7] ............................................... F16H 49/00
(52) U.S. Cl. ........................................................ 74/640
(58) Field of Search ............................................ 74/640

(56) References Cited

U.S. PATENT DOCUMENTS 6,082,222 A * 7/2000 Kiyosawa et al. ............ 74/640

FOREIGN PATENT DOCUMENTS

JP 10-318338 12/1998

* cited by examiner

Primary Examiner—Sherry Estremsky
(74) Attorney, Agent, or Firm—Burns, Doane, Swecker & Mathis, L.L.P.

(57) ABSTRACT

A lightweight wave gear device has a similar engagement rigidity, tooth surface hardness, and abrasion resistance as when a ferrous material is used. A cup-shaped wave gear device 1 has a rigid internal gear 2 that is formed of a lightweight alloy, such as an aluminum alloy, and internal teeth 21 are formed with a height that is 1.1 to 1.3 times the height used for internal gears that are made of a ferrous material. A hard, electrolessly plated coating is also formed on the tooth surface 21a of the internal teeth 21. By doing so, a lightweight wave gear device can be obtained with a similar engagement rigidity, tooth surface strength, and abrasion resistance to a wave gear device that has a rigid internal gear formed of a ferrous material.

12 Claims, 3 Drawing Sheets

LIGHTWEIGHT WAVE GEAR DEVICE

This application claims priority under 35 U.S.C. §§119 and/or 365 to JP2001-151831 filed in Japan on May 22, 2001; the entire content of which is hereby incorporated by reference.

BACKGROUND OF THE INVENTION

1. Field of the Invention

The present invention relates to a lightweight wave gear device that is equipped with a rigid internal gear made of a lightweight alloy.

2. Related Art

A wave gear device is usually composed of a ring-shaped rigid internal gear, a flexible external gear that is also ring-shaped and is disposed on an inside of the rigid internal gear, and a wave generator that is fitted into an inside of the flexible external gear. The wave generator is composed of a rigid wave plug with an oval outline and a wave bearing that is fitted on an outer circumferential surface of the wave plug, so that the external gear is bent into an oval shape and the external teeth positioned at both ends of the major axis of the flexible external gear engage the internal teeth of the rigid internal gear. When the wave generator is rotated by a motor or the like, the engaging parts of both gears move in a circumferential direction. As a result, the two gears rotate relative to one another due to a difference in the number of teeth on each gear. This difference in the number of teeth is normally two, and the rigid internal gear is normally fixed to a device housing or the like, so that a rotational output of a speed that is significantly reduced, based on the difference in the number of teeth, is obtained from the flexible external gear.

In order to reduce the weight of a wave gear device of the above construction, the inventors of the present invention have proposed manufacturing the rigid internal gear and wave generator from a lightweight alloy, such as an aluminum alloy. One example of such a lightweight wave gear device is disclosed in JP-A 10-318338.

Compared to the normal case where a rigid internal gear is manufactured from a ferrous material, a rigid internal gear that is made of aluminum alloy or another lightweight alloy suffers from a large decrease in the engagement rigidity (which is to say, there is a decrease in ratcheting torque), resulting in gear slippage. In order to achieve a similar level of rigidity as that achieved by a rigid internal gear made of a ferrous material, the external diameter and width of the rigid internal gear have to be increased. Such changes in the dimensions of the rigid internal gear make it necessary to change the dimensions of the part of a device, such as a robot, to which the wave gear device is attached. In other words, such changes make it necessary to change the user device specification for the wave gear device. Such changes to the dimensions are usually very difficult to achieve.

When the rigid internal gear is formed of a lightweight alloy, there is a further problem in that surface hardness and abrasion resistance of the gear teeth are lower than when a ferrous material is used. Furthermore, there is the risk of surface parts, which act as the bearing surfaces for fastening bolts that attach the rigid internal gear to other members, being unable to withstand the pressure that acts on the bearing surfaces and so becoming deformed.

SUMMARY OF THE INVENTION

The present invention was conceived in view of the above problems, and has an object of providing a wave gear device where the weight of the rigid internal gear can be reduced without changing the dimensions of the rigid internal gear.

A second object of the present invention is to provide a wave gear device where the weight of the rigid internal gear can be reduced without causing decreases in the abrasion resistance or fastening strength of the rigid internal gear.

To achieve the above and other objects, according to the present invention, there is provided a lightweight wave gear device which comprises a ring-shaped rigid internal gear, a ring-shaped flexible external gear, and a wave generator that flexes the external gear in a radial direction and has the flexible external gear partially engage the internal gear, while also moving engaging parts of the internal gear and the external gear in a circumferential direction, wherein the internal gear is made of one out of a group consisting of: aluminum alloy; copper alloy; titanium alloy; or magnesium alloy, and the internal gear is formed with internal teeth having a high profile.

A height of the internal teeth that are formed on the internal gear should normally be set at 1.1 to 1.3 times the height of conventional internal teeth that are formed on an internal gear made of a ferrous material.

To improve the abrasion resistance of the internal gear and suppress any falls in fastening strength, it is preferable for a plated coating of a material that has a higher modulus of elasticity than a material forming the internal gear to be formed on at least tooth surface parts, out of a surface of the internal gear.

The plated coating may be an electroless Ni—P plated coating.

With the constitution of the present invention, the internal gear may be formed of one of an aluminum alloy with a modulus of elasticity that is at least 8500 kgf/mm$^2$ and a titanium alloy.

In another aspect of the present invention, there is provided a lightweight wave gear device which comprises a ring-shaped rigid internal gear, a ring-shaped flexible external gear, and a wave generator that flexes the external gear in a radial direction and has the flexible external gear partially engage the internal gear, while also moving engaging parts of the internal gear and the external gear in a circumferential direction, wherein the internal gear is formed of one of an aluminum alloy with a hardness of at least Hv130 and a titanium alloy, and an electrolessly plated coating is formed on at least tooth surface parts out of a surface of the internal gear.

Here, it is preferable for the internal gear to have a hardness of at least Hv150 and a tensile strength of 40 kgf/mm$^2$.

It is preferable for there to be little difference in hardness between the surface of the main material of the internal gear and the plated coating. Accordingly, it is preferable for the parts of the surface of the internal gear on which the electrolessly plated coating is formed to be subjected to a surface hardening process achieved through shot peening.

The electrolessly plated coating may be made of one of Ni—P, Ni—P—B, and Cr.

The thickness of the electrolessly plated coating may be set in a range of 5 to 40 microns.

The hardness of the electrolessly plated coating needs to correspond to the hardness of the flexible external gear that the rigid internal gear engages. Normally, the hardness of the electrolessly plated coating may be set in a range of Hv300 to Hv1200.

In order to suppress falls in the fastening strength with which the rigid internal gear is fastened to other members, it is preferable for the electrolessly plated coating to be formed on ring-shaped end surfaces on both sides of the internal gear so as to increase the hardness of the surface parts that form the bearing surfaces for fastening bolts.

DESCRIPTION OF THE PREFERRED EMBODIMENTS

The following describes, with reference to the attached drawings, two lightweight wave gear devices to which the present invention has been applied.

Figure 1:
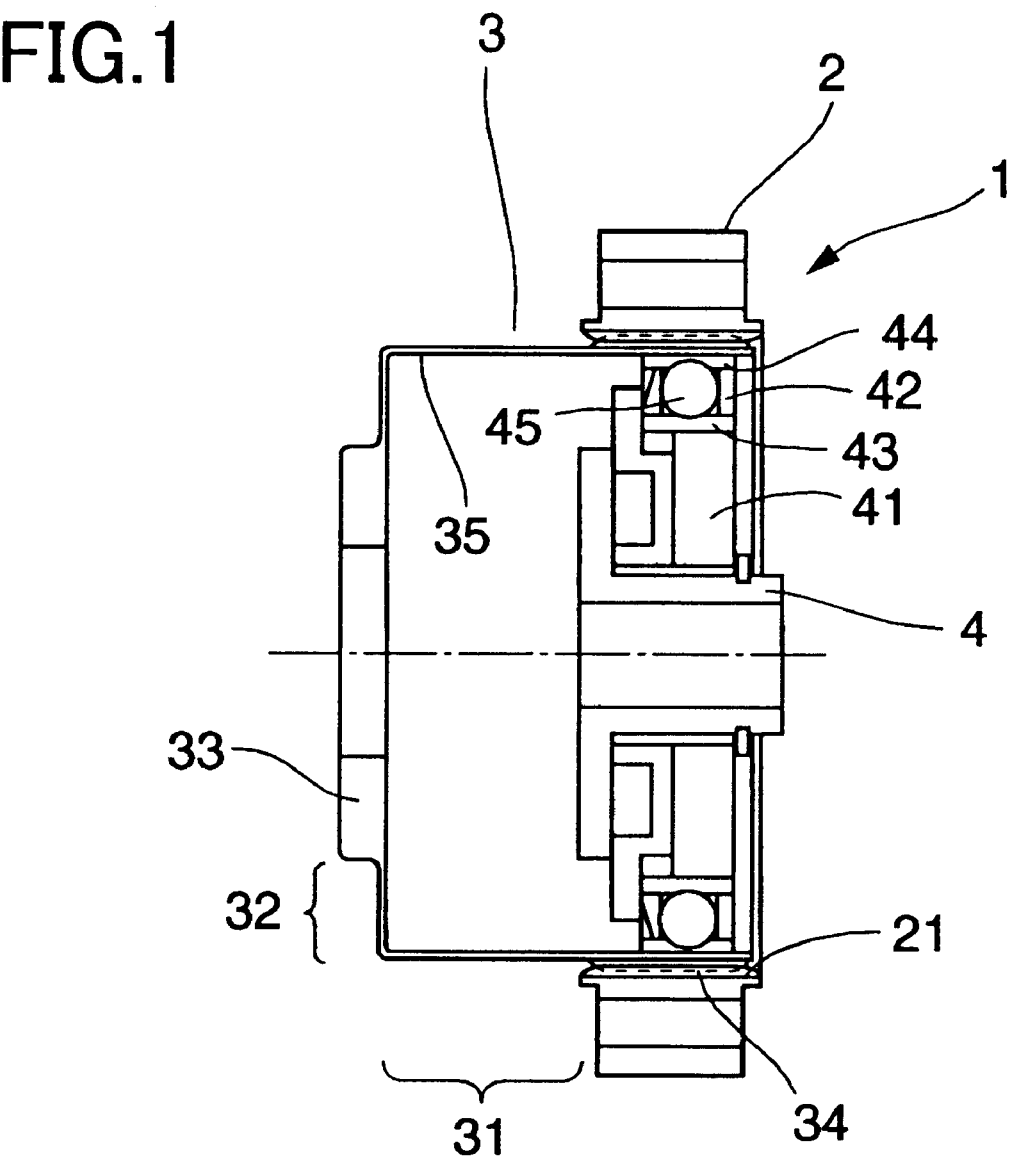
FIG. 1 is a longitudinal sectional view showing a cup-shaped wave gear device to which the present invention can be applied.
Figure 2:
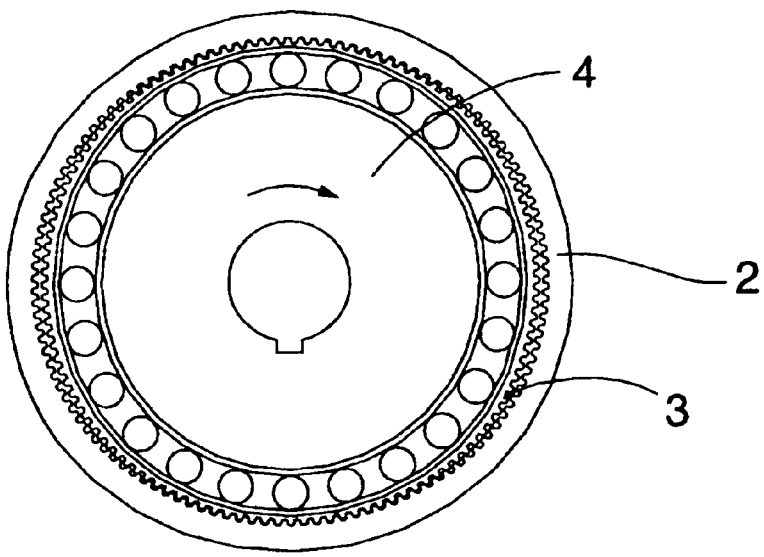
FIG. 2 is a frontal view of the wave gear device of FIG. 1.

FIG. 1 and FIG. 2 are respectively a sectional view and a frontal view showing a cup-shaped wave gear device to which the present invention can be applied. As shown in these drawings, the cup-shaped wave gear device 1 of the embodiments is composed of a rigid internal gear 2 that is ring-shaped, a cup-shaped flexible external gear 3 that is disposed on an inside of the rigid internal gear 2, and a wave generator 4 that has an oval outline and is fitted into an inside of the external gear 3.

The cup-shaped external gear 3 is provided with a cylindrical trunk part 31, a ring-shaped diaphragm 32 that extends inwards in a radial direction from the edge of an opening at one end of the trunk part 31, a ring-shaped boss 33 that is integrally formed with an inner circumferential edge of the diaphragm 32, and external teeth 34 that are formed in an outer circumferential part of the opening at the other end of the trunk part 31. The external teeth 34 can engage the internal teeth 21 of the rigid internal gear 2.

The wave generator 4 is composed of a rigid wave plug 41 that has an oval outline and a wave bearing 42 that fits onto an outer circumference of the wave plug 41. The wave bearing 42 is equipped with an inner ring 43 that fits onto an outer circumferential surface of the wave plug 41, an outer ring 44 that fits into a trunk part inner circumferential surface 35 of the external gear 3, and balls 45 that are inserted so as to be free to roll between the inner ring 43 and the outer ring 44.

The wave generator 4 flexes the part of the flexible external gear 3 in which the external teeth are formed into an oval shape, so that the external teeth 34 engage the internal teeth 21 of the internal gear 2 at positions at both ends of the major axis of the oval shape. When the wave generator 4 is rotationally driven by a motor or the like, the engaging parts of the gears 2 and 3 move in a circumferential direction. Due to a difference in the number of teeth between the gears 2 and 3, these gears 2 and 3 rotate relative to one another. This difference in the number of teeth is usually set at two, and the rigid internal gear 2 is usually fixed to a device housing or the like, so that a rotational output of a speed that is significantly reduced in accordance with the number of teeth is obtained from the external gear 3.

First Embodiment

Figure 3:
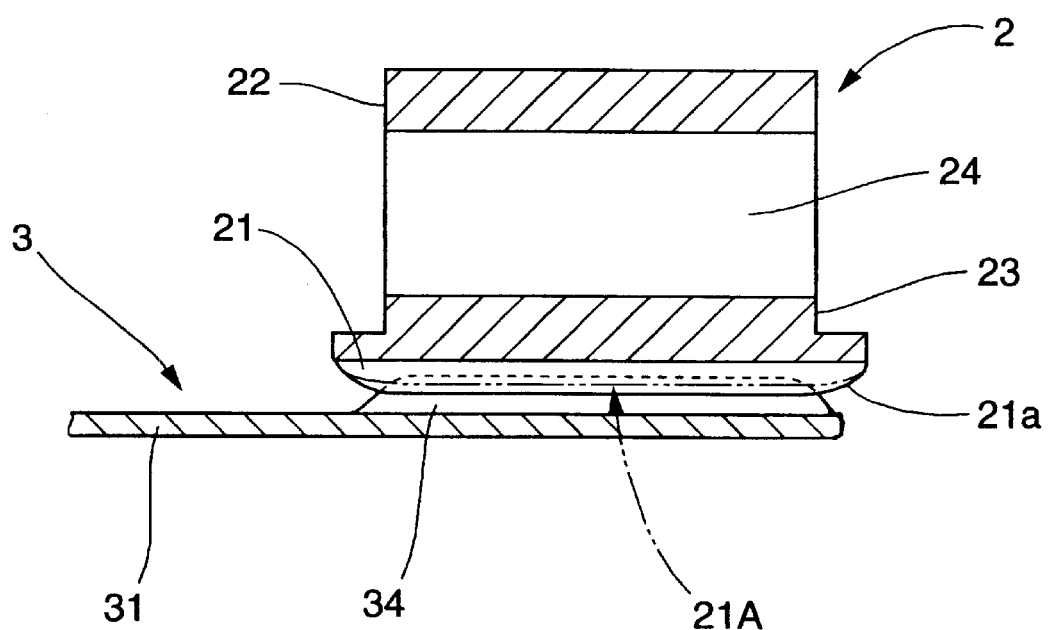
FIG. 3 is an explanatory view showing a rigid internal gear according to the first embodiment.

A cup-shaped wave gear device 1 of the above construction was produced with the rigid internal gear 2 being manufactured from an aluminum alloy with a modulus of elasticity of at least 8500 kgf/mm² or a titanium alloy. The internal teeth 21 on the rigid internal gear 2 were formed as high-profile teeth. This is to say, the internal teeth 21 were produced with a height that is 1.1 to 1.3 times the height of conventional teeth that are made of a ferrous material and have the form shown by the imaginary line 21A in FIG. 3. An electroless Ni—P coating was also formed in the part shown by the thick line in FIG. 3. This is to say, an electroless Ni—P coating that has a higher modulus of elasticity than the material used for the internal gear 2 was formed on the tooth surface part 21a of the internal teeth 21 and on the left and right ring-shaped end surfaces 22 and 23.

With the wave gear device of the above construction, a similar level of rigidity was achieved as in the case where the rigid internal gear is made of a ferrous material, without making the external diameter and the width of the rigid internal gear 2 larger than the case where the rigid internal gear is made of a ferrous material. In other words, a similar amount of ratcheting torque was obtained, and it was confirmed that problems such as gear slippage do not occur.

It was also confirmed that since the tooth surfaces of the internal teeth are subjected to electroless plating, abrasion resistance was at a similar level to the case where the internal gear is made of a ferrous material.

It was also confirmed that since the left and right ring-shaped end surfaces of the rigid internal gear 2 are also subjected to electroless plating, the fastening strength achieved when the present rigid internal gear is fastened to other members is at a similar level to the case where the rigid internal gear is made of a ferrous material. In more detail, bolt holes 24 for fastening bolts that fix the rigid internal gear to other members are formed, so that the ring-shaped end surfaces 22 and 23 function as the bearing surfaces for the fastening bolts that are attached to the bolt holes 24. If these ring-shaped end surfaces 22 and 23 were not hard, the bearing surface pressure that acts when fastening bolts are in place would result in these end surfaces becoming deformed, thereby weakening the fastening strength. However, in the present embodiment, plating these parts ensures that such problems do not arise.

It should be noted that the plated coating may be formed on every surface of the rigid internal gear 2 as this simplifies the manufacturing process.

Second Embodiment

The wave gear device 1 with the construction shown in FIGS. 1 and 2 was produced with the rigid internal gear 2 being manufactured from an aluminum alloy with a hardness of at least Hv130 or a titanium alloy. Out of the surfaces of the rigid internal gear, at least the tooth surfaces of the internal teeth were subjected to electroless plating. It was confirmed that doing so produces a lightweight wave gear device with similar levels of rigidity and abrasion resistance to a wave gear device with an internal gear made of a ferrous material.

It is preferable for the rigid internal gear to be formed from a material that has a hardness of at least Hv150 and a tensile strength of 40 kgf/mm².

It is also preferable to minimize the difference in hardness at the boundary between the main material of the rigid internal gear and the electrolessly plated coating. In order to minimize this difference in hardness, as one example it is preferable to perform shot peening at the parts of the surface of the internal gear where the electrolessly plated coating is formed using a projectile material with a particle diameter of 0.1 mm or less, so as to harden the surface at these parts.

The surfaces of the main material of the rigid internal gear should preferably be subjected to a planing process such as a double replacement reaction so that an electrolessly plated coating that has an even thickness and favorably adheres to the main material surfaces can be formed.

Nickel-phosphorus (Ni—P), nickel-phosphorus-boron (Ni—P—B), or chromium (Cr) may be used as the plating material for the electrolessly plated coating.

The thickness of the electrolessly plated coating may be set in a range of 5 to 40 microns.

The hardness of the electrolessly plated coating can be set in a range of Hv300 to Hv1200. In more detail, the hardness of the tooth surfaces of the internal teeth needs to be set at a similar level to the hardness of the tooth surfaces of the external teeth on the external gear, which are engaged by the internal teeth and are made of a ferrous material. When the external teeth are made of a normal ferrous material, the hardness of the internal teeth should be set in a range of Hv300 to Hv500, while when the external teeth are made of a high-strength ferrous material, the hardness of the internal teeth should be set in a range of Hv500 to Hv1200, so that the hardness of the internal teeth may be determined based on the hardness of the external teeth.

In addition to the tooth surfaces of the internal teeth, the electrolessly plated coating may be formed on the left and right ring-shaped end surfaces of the rigid internal gear, as in the first embodiment described above. By doing so, decreases in the fastening strength when the rigid internal gear is attached to other members can be suppressed.

The rigid internal gear of the present embodiment is formed using an aluminum alloy or a titanium alloy, so that a large decrease in weight can be achieved compared to a gear made from a ferrous material, while decreases in the strength of the tooth surfaces, abrasion resistance, and the fastening strength can be suppressed.

As described above, a wave gear device according to the present invention has a rigid internal gear made of a lightweight metal alloy and has teeth with a higher profile than the teeth that are formed when a ferrous material is used. Accordingly, a lightweight wave gear device can be provided with a similar level of engagement rigidity as a wave gear device that includes a rigid internal gear made of a ferrous material.

Another wave gear device according to the present invention has a rigid internal gear formed using an aluminum alloy with a predetermined hardness or higher or a titanium alloy, with an electrolessly plated coating of a hard material being formed on the tooth surfaces of the internal teeth. As a result, a lightweight wave gear device can be provided with similar levels of tooth-surface hardness and abrasion as a wave gear device that includes a rigid internal gear made of a ferrous material.

What is claimed is:

1. A lightweight wave gear device, comprising:
   a ring-shaped rigid internal gear;
   a ring-shaped flexible external gear; and
   a wave generator that flexes the external gear in a radial direction and has the external gear partially engage the internal gear, while also moving engaging parts of the internal gear and the external gear in a circumferential direction,
   wherein the internal gear is made of one out of a group consisting of: aluminum alloy; copper alloy; titanium alloy; and magnesium alloy, and
   the internal gear is formed with internal teeth having a high profile.

2. A lightweight wave gear device according to claim 1, wherein the internal teeth formed on the internal gear have a height that is 1.1 to 1.3 times a height of conventional internal teeth that are formed on an internal gear made of a ferrous material.

3. A lightweight wave gear device according to claim 1, wherein a plated coating of a material that has a higher modulus of elasticity than a material forming the internal gear is formed on at least tooth surface parts, out of a surface of the internal gear.

4. A lightweight wave gear device according to claim 3, wherein the plated coating is an electroless Ni—P plated coating.

5. A lightweight wave gear device according to claim 1, wherein the internal gear is formed of one of an aluminum alloy with a modulus of elasticity that is at least 8500 kgf/mm$^2$ and a titanium alloy.

6. A lightweight wave gear device, comprising:
   a ring-shaped rigid internal gear;
   a ring-shaped flexible external gear; and
   a wave generator that flexes the external gear in a radial direction and has the external gear partially engage the internal gear, while also moving engaging parts of the internal gear and the external gear in a circumferential direction,
   wherein the internal gear is formed of one of an aluminum alloy with a hardness of at least Hv130 and a titanium alloy, and
      an electrolessly plated coating is formed on at least tooth surface parts out of a surface of the internal gear.

7. A lightweight wave gear device according to claim 6, wherein the internal gear has a hardness of at least Hv150 and a tensile strength of 40 kgf/mm$^2$.

8. A lightweight wave gear device according to claim 7, wherein the parts of the surface of the internal gear on which the electrolessly plated coating is formed are subjected to a surface hardening process achieved through shot peening.

9. A lightweight wave gear device according to claim 6, wherein the electrolessly plated coating is one out of a group consisting of: Ni—P; Ni—P—B; and Cr.

10. A lightweight wave gear device according to claim 6, wherein a thickness of the electrolessly plated coating is in a range of 5 to 40 microns.

11. A lightweight wave gear device according to claim 6, wherein a hardness of the electrolessly plated coating is in a range of Hv300 to Hv1200.

12. A lightweight wave gear device according to claim 6, wherein the electrolessly plated coating is formed on ring-shaped end surfaces on both sides of the internal gear.

* * * * *